(12) United States Patent
Soltes et al.

(10) Patent No.: US 8,862,553 B2
(45) Date of Patent: Oct. 14, 2014

(54) TELEPHONE STATIONS WITH INDEPENDENT BACKUP/RESTORE FEATURE

(75) Inventors: John W. Soltes, Ocean Township, NJ (US); Randall J. Penning, Middletown, NJ (US); Robert L. Mitchell, Aberdeen, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1835 days.

(21) Appl. No.: 11/759,899

(22) Filed: Jun. 7, 2007

(65) Prior Publication Data

US 2008/0082594 A1 Apr. 3, 2008

Related U.S. Application Data

(60) Provisional application No. 60/811,433, filed on Jun. 7, 2006, provisional application No. 60/811,415, filed on Jun. 7, 2006.

(51) Int. Cl.
*G06F 17/00* (2006.01)
*G06F 17/30* (2006.01)

(52) U.S. Cl.
CPC ............................. *G06F 17/30067* (2013.01)
USPC ......................................... 707/653; 707/661

(58) Field of Classification Search
USPC .......... 370/352; 455/414.2; 707/1, 2, 10, 100, 707/103 X, 200, 202, 203, 204, 999.2, 707/999.202, 999.203, 999.204, 622, 623, 707/647, 659, 610, 640, 653, 655, 661, 671, 707/674; 709/203, 217, 219
See application file for complete search history.

(56) References Cited

U.S. PATENT DOCUMENTS

| | | | |
|---|---|---|---|
| 6,219,698 B1 * | 4/2001 | Iannucci et al. | 709/221 |
| 6,370,141 B1 * | 4/2002 | Giordano et al. | 709/219 |
| 6,546,002 B1 * | 4/2003 | Kim | 370/351 |
| 7,054,910 B1 * | 5/2006 | Nordin et al. | 707/999.202 |
| 7,567,541 B2 * | 7/2009 | Karimi et al. | 709/203 |
| 7,603,435 B2 * | 10/2009 | Welingkar et al. | 709/217 |
| 2007/0036152 A1 * | 2/2007 | Giordano et al. | 370/352 |

* cited by examiner

*Primary Examiner* — Marc Filipczyk
(74) *Attorney, Agent, or Firm* — Muncy, Geissler, Olds & Lowe, P.C.

(57) ABSTRACT

A method, system, and computer-readable medium for backing up and/or restoring user-specific settings for one or more IP telecommunications terminals. A backup process is initiated through a user interface of the IP telecommunications terminal. A file name and a backup file are supplied from the telecommunication terminal during a backup process. The backup file is transferred to an HTTP server and the backup file is transferred to the IP telecommunications terminal or other terminals in response to an HTTP GET message received from an IP telecommunications terminal connected to the HTTP server. Accordingly, multiple users can enjoy customized user-interfaces at multiple locations and across multiple platforms.

20 Claims, 8 Drawing Sheets

TABLE 10: OPTIONS AND NON-PASSWORD
PARAMETERS SAVED DURING BACKUP

| PARAMETER NAME | SETTING |
| --- | --- |
| LOGACTIVE | CALL LOG ACTIVE |
| LOGBRIDGED | LOG BRIDGED CALLS |
| OPTAGCHAND | HANDSET AUTOMATIC GAIN CONTROL |
| OPTAGCHEAD | HEADSET AUTOMATIC GAIN CONTROL |
| OPTAGCSPKR | SPEAKER AUTOMATIC GAIN CONTROL |
| OPTAUDIOPATH | AUDIO PATH |
| OPTCLICKS | BUTTON CLICKS |
| OPTERRORTONE | ERROR TONES |
| PERSONALRING | PERSONALIZED RING |
| PHNREDIAL | REDIAL |
| PHNSCRONCALL | GO TO PHONE SCREEN ON CALLING |
| PHNSCRONALERT | GO TO PHONE SCREEN ON RINGING |
| PHNTIMERS | CALL TIMER |
| PHNVISUALALERT | VISUAL ALERTING |

*FIG. 4*

TABLE 9: BACKUP FILE FORMATS

| ITEM/DATA VALUE | FORMAT |
|---|---|
| GENERIC | NAME-VALUE |
| CONTACTS | ASKNAMEmmm=ENTRY NAME<br>A SKNUMBERmmm=ENTRY_NUMBER_1<br>(WHERE mmm IS THE ONE-, TWO-, OR THREE-DIGIT ENTRY ID, WITH LEADING ZEROS FOR SINGLE AND DOUBLE-DIGIT ENTRY ID'S) |
| USER-GENERATED CALL APPEARANCE LABELS WITH BUTTON IDENTIFIERS OF mm (THE ONE- OR TWO-DIGIT BUTTON NUMBER OF THE ENTRY WITH A LEAD ZERO FOR SINGLE-DIGIT NUMBERS) | PHNLABELmm=CAUSERLABEL |
| USER-GENERATED TELEPHONE FEATURE BUTTON LABELS WITH BUTTON IDENTIFIERS OF mm (THE ONE- OR TWO-DIGIT BUTTON NUMBER OF THE ENTRY WITH A LEAD ZERO FOR SINGLE-DIGIT NUMBERS) | PHNLABELmm=FBUSERLABEL |
| USER-GENERATED SBM24 CALL APPEARANCE OR FEATURE BUTTON LABELS WITH BUTTON IDENTIFIERS OF mm (THE ONE- OR TWO-DIGIT BUTTON NUMBER OF THE ENTRY WITH A LEAD ZERO FOR SINGLE-DIGIT NUMBERS) | PHNLABELmm=FBUSERLABEL |

*FIG. 5*

TABLE 7: 9600 SERLEA IP TELEPHONE CUSTOMIZABLE SYSTEM PARAMETERS

| PARAMETER NAME | DEFAULT VALUE | DESCRIPTION AND VALUE RANGE |
| --- | --- | --- |
| AGCHAND | 1 | AUTOMATIC GAIN CONTROL STATUS FOR HANDSET (0=DISABLED 1=ENABLED) |
| AGCHEAD | 1 | AUTOMATIC GAIN CONTROL STATUS FOR HEADSET (0=DISABLED 1=ENABLED) |
| AGCSPKR | 1 | AUTOMATIC GAIN CONTROL STATUS FOR SPEAKER (0=DISABLED 1=ENABLED) |
| APPNAME | **(NULL) | PRIMARY APPLICATION IMAGE FILE NAME, AS PROVIDED IN THE 9600 UPGRADE. TXT FILE |
| APPSTAT | 1 | CONTROLS WHETHER SPECIFIC APPLICATIONS ARE ENABLED, RESTRICTED, OR DISABLED. VALUES ARE 1=ALL APPLICATIONS ENABLED. 2=SPEED DIAL (CONTACTS) CHANGES AND CALL LOG DISABLED REDIAL LAST NUMBER ONLY. 3=SPEED DIAL (CONTACTS) CHANGES DISABLED. DISABLED, 0=SPEED DIAL (CONTROLS) CHANGES, CALL LOG AND REDIAL DISABLED. |
| AUTH | 0 | SCRIPT FLE AUTHENTICATION VALUE (0=HTTP IS ACCEPTABLE, 1=HTTP IS REQUIRED). |
| BAKLIGHTOFF | 120 | NUMBER OF MINUTES WITHOUT DISPLAY ACTIVITY TO WAIT BEFORE TURNING OFF THE BACKLIGHT. VALUES 0-999, NO SPACES AND NO NULL VALUE. A VALUE OF 0 MEANS THE BACKLIGHT NEVER TURNS OFF. |
| BRURI | **(NULL) | URL USED FOR BACKUP AND RETRIEVAL OF USER DATA. SPECIFY HTTP SERVER AND DIRECTORY PATH TO BACKUP FILE. DO NOT SPECIFY BACKUP FILE NAME.VALUE 0-255 ASCii CHARACTERS. NULL IS A VALID VALUE AND SPACES ARE ALLOWED. |

*FIG. 6*

| | | |
|---|---|---|
| CNAPORT | 50002 | AVAYA CONVERGED NETWORK ANALYZER (CNA) SERVER REGISTARTION TRANSPORT-LAYER PORT NUMBER (0-65535). |
| CNASRVR | **(NULL) | TEXT STRING CONTAINING THE IP ADDRESSES OF ONE OR MORE AVAYA CONVERGED NETWORK ANALYZER (CNA) SERVERS TO BE USED FOR REGISTRATION. FORMAT IS DOTTED DECIMAL OR DNS FORMAT, SEPERATED BY COMMAS, WITH NO SPACES (D-255 ASCII CHARACTERS, INCLUDING COMMAS). |
| CTUDPPORT | 49721 | COMPUTER TECHNOLOGY INTERFACE PORT UDP PORT VALUE FOR RECEPTION OF BROADCAST CTI DISCOVERY MESSAGES, FROM "49714" TO "49721" NULL IS NOT A VALID VALUE AND SPACES NOT ALLOWED. |
| DHCPSTD | 0 | DHCP STANDARD LEASE VIOLATION FLAG, INDICATES WHETHER TO KEEP THE IP ADDRESS IF THERE IS NO RESPONSE TO LEASE RENEWAL. IF SET TO "1" (NO) THE TELEPHONE STRICTLY FOLLOWS THE DHCP STANDARD WITH RESPECT TO GIVING UP IP ADDRESSES WHEN THE DHCP LEASE EXPIRES. IF SET TO "0" (YES) THE TELEPHONE CONTINUES USING THE IP ADDRESS UNTIL IT DETECTS RESET OR A CONFLICT (SEE <u>DHCP GENERIC SETUP</u>) |

*FIG. 6 (CONT'D)*

TELEPHONE STATIONS WITH INDEPENDENT BACKUP/RESTORE FEATURE

CROSS REFERENCE TO RELATED APPLICATIONS

This application claims priority to U.S. Provisional Application No. 60/811,433 entitled "TELEPHONE STATIONS WITH STATION INDEPENDENT BACKUP/RESTORE FEATURE" filed Jun. 7, 2006, and U.S. Provisional Application No. 60/811,415 entitled "SYSTEM AND METHOD FOR NAVIGATING WEB PAGES VIA AN IP TELEPHONE" filed on Jun. 7, 2006, each of which are hereby expressly incorporated by reference herein.

BACKGROUND

This description generally relates to telecommunication stations having a customized user interface, and more particularly to methods, systems, and telecommunication stations having customized user interfaces that are compatible across multiple station platforms and accessible from multiple client devices.

Description of the Background Art

Conventional telephone stations include user interfaces which allow a user of the telephone station to customize the appearance and functionality of a user interface of the telephone station. For example, call logs, address books, and phone options, such as ring tones, may be stored and often edited locally at the client device. Since parameters relating to and data for the user interface are stored locally, e.g., in a memory device within the telephone station, the user is able to retrieve user interface settings and features, e.g., in the event of power loss or rebooting of the client device.

SUMMARY

An exemplary IP Telephone station is capable of presenting a call log, directory, and other data to a user of the IP Telephone station, and other IP Telephone stations, via a user interface, e.g., a display and/or associated softkeys, line buttons, etc, that is accessible locally and across a plurality of IP Telephone stations. Accordingly, customized display information may be presented to the user regardless of the user interface of the particular station the user is employing, and/or regardless of the IP Telephone station(s) that the user is employing.

In one general aspect, a method for backing up user-specific settings for an IP telecommunications terminal includes initiating a backup process through a user interface of the IP telecommunications terminal, wherein a file name and a backup file are supplied from the telecommunication terminal. The backup file is transferred to an HTTP server via an HTTP PUT message. A determination if the backup file has been successfully transferred to the HTTP server includes receiving an indication of a successful transfer or a failed file transfer.

Implementations of this aspect may include one or more of the following features. For example, the backup file may include settings relating to one or more of the following parameters: call log settings, bridged call settings, accessory gain control settings, audio path settings, button click settings, error tone settings, ring tones, user interface settings, visual alert settings, call timer settings, and/or redial settings. The backup file may include one or more of user-specific data, user-specific contacts, user-generated call appearance features, and/or user-generated button or softkey features. A uniform resource identifier (URI) may be provided, such as in a message between the HTTP server and client device, designated for backup and restoration of user data from the HTTP server. The URI identifies the HTTP server and a directory path for the backup file. User-specific settings may be restored to the IP telecommunication terminal and/or other terminals associated with the user, wherein the backup file is transferred from the HTTP server to the IP telecommunication terminal. An HTTP GET message may be transferred to the HTTP server, and the backup file may be transferred to the IP telecommunications terminal in response to the HTTP GET message.

In another general aspect, a system for backing up and/or restoring user-specific settings for an IP telecommunications terminal includes a plurality of IP telecommunications terminals, each IP telecommunications terminal including a user interface configured to initiate a backup process and a restore process, and at least one HTTP server configured to store a backup file for user-specific settings for each user among a plurality of users associated with the telecommunications terminals. The IP telecommunications terminals are configured to transfer each backup file to the HTTP server via an HTTP PUT message and to receive each backup file in response to an HTTP GET message.

Implementations of this aspect may include one or more of the following features. For example, each IP telecommunication terminal is configured to receive an indication of a successful transfer or failed transfer of a respective backup file sent to the HTTP server. Each IP telecommunication terminal is configured to modify a backup file comprising user-specific settings relating to one or more of the following parameters: call log settings, bridged call settings, accessory gain control settings, audio path settings, button click settings, error tone settings, ring tones, user interface settings, visual alert settings, call timer settings, and/or redial settings. The backup file may include one or more of user-specific data, user-specific contacts, user-generated call appearance features, and/or user-generated button and/or softkey features. Each IP telecommunications terminal may be configured to replace a current backup file with a backup file associated with another user logging into the IP telecommunications terminal through PSA/IP login/logoff.

In another general aspect, a computer-readable medium having computer-executable instructions contained therein for a method for backing up and restoring user-specific settings for an IP telecommunications terminal includes instructions for initiating a backup process through a user interface of the IP telecommunications terminal, wherein a file name and a backup file are supplied from the telecommunication terminal; transferring the backup file to an HTTP server via an HTTP PUT message; determining if the backup file has been successfully transferred to the HTTP server, wherein determining includes receiving an indication of a successful transfer or a failed file transfer; transferring an HTTP GET message to the HTTP server; and transferring the backup file to the IP telecommunications terminal in response to the HTTP GET message.

One or more of the foregoing aspects may provide one or more of the following advantages. Specifically, one or more of the foregoing method, system, and/or computer-readable medium can provide multiple users with customized user-interfaces at multiple locations and across multiple platforms. The foregoing aspects permit a user to back up and/or restore user-specific settings for one or more IP telecommunications terminals. A backup or restore process may be initiated through a user interface of any IP telecommunications terminal connected to the HTTP server. A file name and a backup file may be supplied from the telecommunication terminal during a backup process. The backup file can be transferred to an HTTP server and the backup file can be transferred to the IP telecommunications terminal or other terminals in response to an HTTP GET message received from an IP telecommunications terminal connected to the HTTP server.

BRIEF DESCRIPTION OF THE DRAWINGS

Further aspects and advantages will become apparent upon reading the following detailed description taken in conjunction with the accompanying drawings summarized below.

FIG. 2 is an exemplary screenshot of a display of the deskphone of FIG. 1.

FIG. 3 is an exemplary screenshot of a display of the deskphone of FIG. 1.

FIG. 4 is a table of available options and non-password parameters that may be saved during an exemplary backup process for a IP telecommunication terminals.

FIG. 5 is a table of exemplary backup file formats, including items and data values, and corresponding file formats.

FIG. 6 is a table of various customizable system parameters for one or more IP telecommunication terminals.

DETAILED DESCRIPTION

Embodiments consistent with the present invention are more specifically set forth in the following description with reference to the appended figures. Wherever possible, the same reference numbers will be used throughout the drawings to refer to the same or like parts.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

As described above, there is a need for intuitive, simple, and easy to use telecommunications terminals for use by visitors, customers, building employees, etc. in common areas or shared spaces of a customer's location, such as building or hotel lobbies, hospital entrances, corporate conference rooms, reception areas, waiting areas, printer or copier rooms, breakrooms, hallways, etc. The exemplary embodiments of a telecommunications terminal described below can provide telephone services and/or informational content to users in a simple and easy to use manner. The exemplary embodiments can be configured to be simple and intuitive in order to keep the experience simple and easy for walk-up users. Thus, the exemplary embodiments can provide a smart telephony and information endpoint located in the shared space of a customer's location. Exemplary embodiments of a telecommunications terminal will be described below with reference to FIGS. 1 through 22B.

Figure 1:
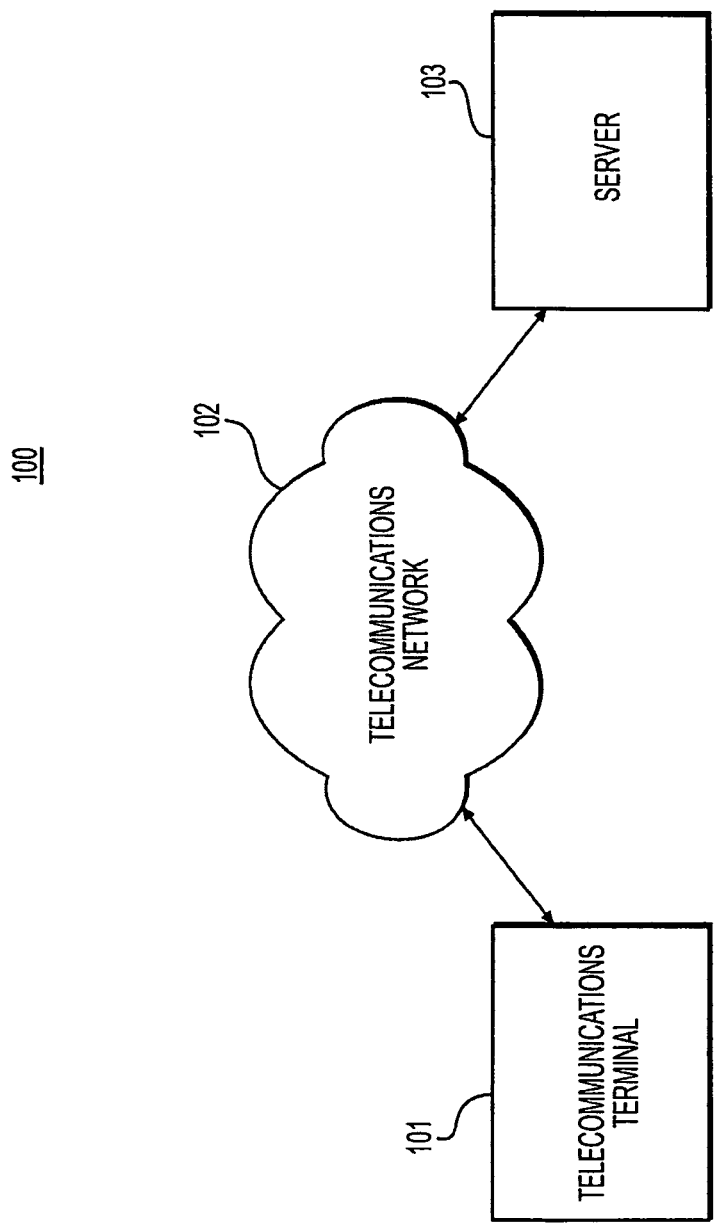
FIG. 1 is a schematic view of an exemplary telecommunications network which includes a telecommunications terminal and server.

FIG. 1 depicts a telecommunications system 100, in accordance with an illustrative embodiment. The telecommunications system 100 can comprise, for example, a telecommunications terminal 101, a telecommunications network 102, and a server 103, which can be interconnected as exemplarily shown.

The telecommunications terminal 101 can be a client machine that is capable of transmitting and receiving packets of data via the telecommunications network 102, in a well-known fashion. For example, a user of the terminal 101 can request information, whereupon the terminal 101 can transmit the request to a content server, such as a server 103, and can subsequently receive the requested information. The terminal 101 also can be capable of performing the tasks described below and with respect to FIGS. 14 through 22B, in accordance with other exemplary embodiments.

The terminal 101, in an illustrative embodiment, can be an Internet Protocol (IP) telephone. In other exemplary embodiments, the terminal 101 can be other types of a telecommunications terminal, such as a Personal Digital Assistant (PDA), softphone, Session Initiation Protocol (SIP) endpoint, H.323 endpoint, personal computer, etc. In any case, it will be clear to those skilled in the art, after reading this specification, how to make and use the exemplary telecommunications terminal 101.

The telecommunications network 102 can provide for end-to-end data communications between one or more clients, such as the terminal 101, and one or more servers, such as server 103. The network 102 can comprise the Internet, in accordance with the exemplary embodiments. In other exemplary embodiments, the network 102 can comprise a different network or networks (e.g., an Ethernet-based network, etc.), in addition to or as an alternative to the Internet. It will be clear to those skilled in the art how to make and use the exemplary network 102.

The server 103 can be, for example, a source of stored data content, such as web pages and other information that is presentable to a user. Moreover, the server 103 can be capable of transmitting and receiving packets of data that are related to the stored content, via the telecommunications network 102 in a well-known fashion. The server 103 can transmit the content in the form of one or more computer files to a client, such as the terminal 101, for example, either (i) when the client requests the content or (ii) autonomously. It will be clear to those skilled in the art, after reading this specification, how to format the computer files that contain the content. It will also be clear to those skilled in the art how to make and use the exemplary server 103.

Figure 2:
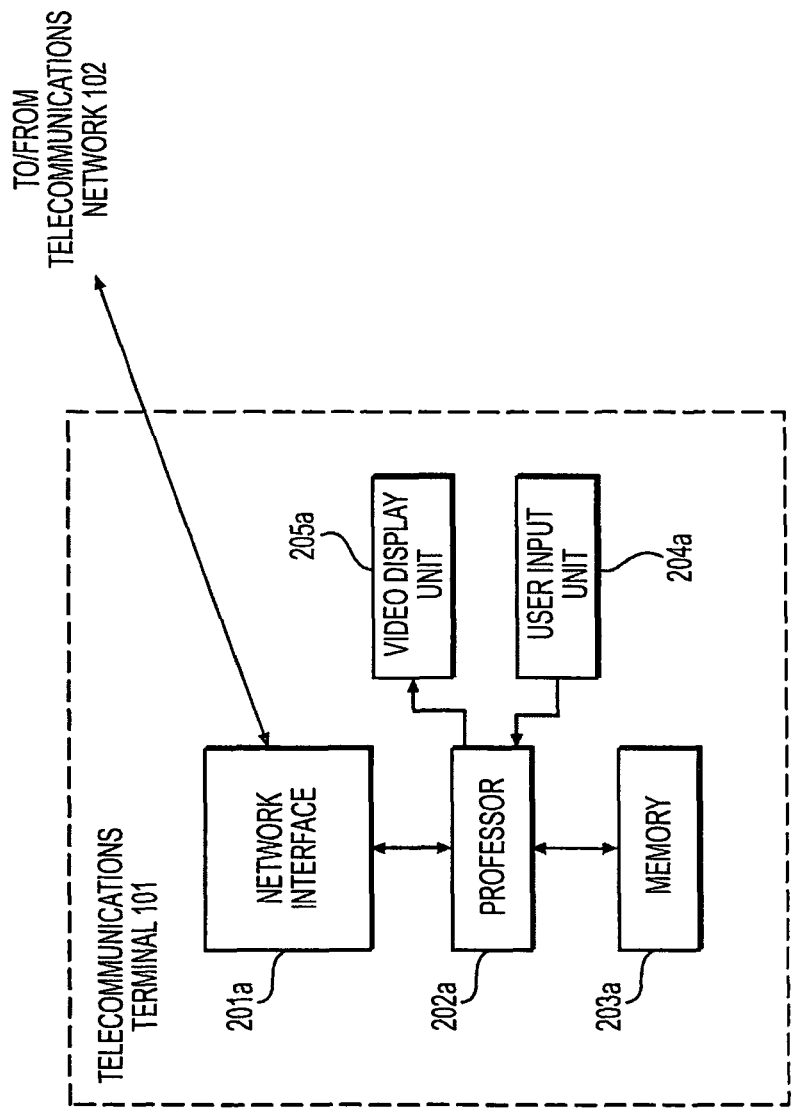
FIG. 2 is a block diagram of an exemplary telecommunications terminal.

FIG. 2 depicts a block diagram of the salient components of a telecommunications terminal 101, in accordance with an exemplary embodiment. The telecommunications terminal 101 can comprise, for example, a network interface 201a, a processor 202a, a memory 203a, a user input unit 204a, and a display unit 205a, interconnected as shown.

The network interface 201a can comprise a receiving part and a transmitting part. The receiving part can receive signals from the network 102, and forward the information encoded in the signals to the processor 202a, for example, in a well-known fashion. The transmitting part can receive information from the processor 202a, and output signals that encode this information to the network 102, in a well-known fashion. It will be clear to those skilled in the art, after reading this disclosure, how to make and use the exemplary network interface 201a.

The processor 202a can be, for example, a general-purpose processor that is capable of (i) receiving information from the network interface 201a and the user input unit 204a, (ii) reading data from and writing data into the memory 203a, (iii) executing the tasks described below and with respect to FIGS. 4 through 6F, and (iv) transmitting information to the network interface 201a and the display unit 205a. In other exemplary embodiments, the processor 202a can be a special-purpose processor. In either case, it will be clear to those skilled in the art, after reading this disclosure, how to make and use the exemplary processor 202a.

The memory 203a can be a non-volatile random-access memory that stores the instructions and the data used by the processor 202a. In accordance an exemplary embodiment, the memory 203a also can store the browser application and the retrieved computer files that contain the data content. It will be clear to those skilled in the art how to make and use the exemplary memory 203a.

The user input unit 204a is a character and user-selection input device that can receive input from a user and transmit signals that represents the input to the processor 202a. The user input unit 204a can comprise fixed function keys (e.g., hard keys) and soft keys, and can provide a user input interface, for example, as shown in the exemplary embodiments described below. The user input unit 204a can comprise an array of buttons, for example, as described below. It will be clear to those skilled in the art, after reading this disclosure, how to make and use the exemplary user input unit 204a.

The display unit 205a can be a display output system that can receive a signal and create a visual image of the signal for a user. The display unit 205a can comprise a display, for example, as shown in the exemplary embodiments described below. It will be clear to those skilled in the art, after reading this disclosure, how to make and use the exemplary display unit 205a.

Figure 3:
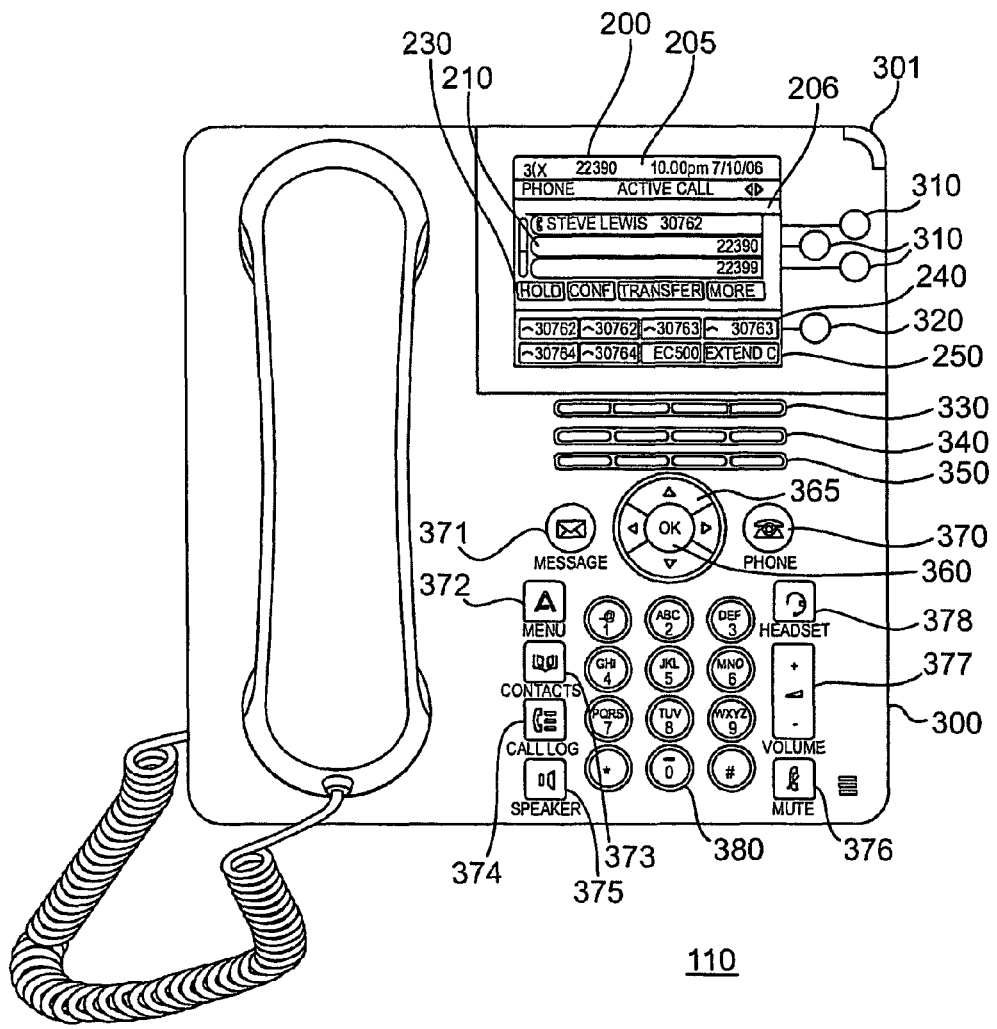
FIG. 3 is a plan view of an exemplary telephone having a display device.

Referring to FIG. 3, an exemplary deskphone 110 includes a display 200 and a keypad portion 300. Although the following exemplary embodiment is described in connection with a VoIP deskphone, one or more features of the following description is applicable to various types of phones, including walkup or lobby phones, cordless phones, and/or other hand-held devices, such as personal digital assistants (PDAs). The keypad portion 300 includes a standard alphanumeric telephone keypad 380 for inputting numbers for calls, activating various features, and/or input of text. The keypad portion 300 includes a message button 371, a phone button 370, and a user navigation device, which includes exemplary directional arrows 365, and a select or OK button 360 for activating audio menu options and/or features selectable from the display 200. The message button 371 permits the user to access voicemail messages and the phone button 370 permits the user to access information relating to active calls.

The deskphone 110 includes a menu button 372, contacts button 373, call log button 374, and speaker button 375, which each provide the user with access to various functions of the deskphone 110. The menu button 372 provides the user with access to adjust and customize options and settings for the telephone, to access Web-based applications, to obtain information about phone or network settings, and/or to log out of the menu feature. The accessible options are typically designated by a system administrator or by the manufacturer dependent upon network capabilities and the level of access and features appropriate for the client device and/or user. Alternatively, or additionally, the accessible options may be adjusted locally at the client device by a user provided with the appropriate level of network access to alter settings on the client device. The contacts button 373 provides access to a list of stored contacts, e.g., for viewing or editing, and the call log button 374 permits the user to view one or more lists relating to the most recent incoming, outgoing, and/or missed calls. The speaker button 375 activates or deactivates the speaker option for the telephone.

The keypad portion 300 also includes a headset option 378, volume adjustment 377, mute button 376 for muting an active call, and a message waiting indicator 301 which provides the user with an indication of voice, email, and/or text messages waiting for the user. The headset option 378 toggles the telephone between a handset/speaker mode and a headset mode for listening to calls and messages. The volume adjustment 377 adjusts the master volume for the deskphone 110. Alternatively, or additionally, volume options may be provided through the activation of the menu button 372 and/or through selectable options on the display 200.

The display 200 includes a status line 205 which may contain information relating to a number of missed calls, a relevant extension number of the most recent missed call, and a date and time field. A prompt line 206 contains information relating to a current call, such as an extension of an active or incoming call, and one or more application lines 210 provide information relating to available lines or extensions, e.g., call information, such as an incoming caller's name and a recipient users extension or name. The application lines 210 are activated with line buttons 310 which allow the user to select an active application line. For example, a highlighted line is shown in FIG. 1 which indicates that a call from "Steve Lewis 30762" is currently active or selected by the user of the deskphone 110.

The display 200 includes a softkey label array which includes softkey labels 230 and auxiliary softkey labels 240, 250. The softkey labels 230 are icons automatically generated and presented to the user depending upon the status of the deskphone 110. For example, the softkey labels 230 shown in FIG. 1, including the [Hold], [Conf], [Transfer], and [More] icons, are indicative of available actions which are presented to the user on the display 200 since the line button 310 associated with the 30762 (Steve Lewis) call has been selected by the user. The auxiliary softkey labels 240, 250 are icons which are automatically generated and presented to the user responsive to a user input to an auxiliary shift button 320. For example, the display 200 includes one row of four softkey labels 230 and two rows of auxiliary softkey labels 240, 250, each containing four icons. Accordingly, the viewable set of auxiliary softkey labels are changed each time the auxiliary shift button 320 is activated by the user, e.g., a new set of eight auxiliary softkey labels is presented to the user. While one auxiliary shift button 320 is shown in FIG. 1, an additional auxiliary shift button 320 may be provided on the opposite side of the display 200, e.g., in a mirrored position on the left side of the display 200 with respect to the auxiliary shift button 320 which is shown positioned on the right side of the display 200.

If two or more auxiliary shift buttons 320 are provided, each may be provided with alternative scrolling capabilities, e.g., another auxiliary shift button 320 positioned on the left side of the display 200 may be configured to provide backward scrolling through sets of auxiliary softkey labels 240, 250 and the auxiliary shift button positioned on the right side of the display 200 may be configured to provide forward scrolling through sets of auxiliary softkey labels, 240, 250. The softkey labels 230 and auxiliary softkey labels 240, 250 may be preprogrammed into the deskphone 200 by a system administrator, the user of the telephone, and/or any other authorized user. The softkey labels 230 and auxiliary softkey labels 240, 250 are programmed to correspond to additional bridged extensions, dial buttons, call options, or any other phone feature or option available for managing calls, call information, and/or additional phone terminals, e.g., such as external phone terminals such as user's cellular telephone. The softkey labels 230 and auxiliary softkey labels 240, 250 may include graphical icons, keywords, alphanumeric identifiers, and/or any combination thereof for each function which is displayed at each softkey label 230, 240, 250.

While the softkey labels 230 typically appear automatically in response to the active status of the deskphone 110, the auxiliary softkey labels 240, 250 that are displayed are controllable by the user through the auxiliary shift button(s) 320. However, one or more of the rows of auxiliary softkey labels 240, 250 may be configured to be automatically displayed dependent upon the active status of the deskphone 110, and the auxiliary shift button(s) 320 may be optionally provided in the particular deskphone 110. Alternatively, the display of the softkey labels 230 may also be controlled through the use of another shift button, e.g., similar to auxiliary shift button 320 (but not shown). Accordingly, the user may be automatically presented with twelve immediately accessible features or options that may be displayed based on the active status of the deskphone 110 and/or based on inputs received at an auxiliary shift button(s) 320. In addition, the options may be selectively and/or automatically changed based on changes in the status of the deskphone 110, e.g., the user shifts from managing voicemail messages to engaging a call with another user on another client device.

The deskphone 110 also includes a button array which includes softkey buttons 330, and two rows of auxiliary softkey buttons 340, 350. Referring to FIG. 3, the button array is shown having one row of four softkey buttons 330 which correspond to and are positioned so as to be substantially horizontally aligned with the row of softkey labels 230 positioned above the button array and on the display 200, e.g., an individual column of softkey labels 230, 240, 250 is horizontally aligned with a corresponding column of softkey buttons 330, 340, 350 about a common vertical axis extending through the column. However, since the button array may include buttons that are slightly larger than the corresponding softkey labels to facilitate easier manipulation with a user's fingers, the button array and softkey label array may be slightly misaligned to account for the difference in size between the two arrays (e.g., as shown in FIG. 1).

The button array may include two or more rows of auxiliary softkey buttons 340, 350. Each row of auxiliary softkey buttons 340, 350 contains four auxiliary softkey buttons which correspond to, and are positioned so as to be substantially horizontally aligned with the two rows of auxiliary softkey labels 240, 250 on the display 200. Accordingly, the various softkey labels 230, 240, 250 and corresponding softkey buttons 330, 340, 350 may be sized and shaped to have similar appearances so that the user intuitively associates the corresponding softkey buttons 330, 340, 350 with the appropriate softkey labels 230, 240, 250 in the softkey label array.

One or more rows of buttons 330, 340, 350 may include illumination elements, such as internal LEDs which provide backlighting through a relatively clear or translucent cover forming the buttons. Whenever a function icon is activated by the user or system, the appropriate button in the button array would be illuminated. Alternatively, or additionally, the corresponding softkey labels 230 or auxiliary softkey labels 240, 250 may be highlighted and/or presented in various fonts, such as, for example, italics, various colors, underlined, and/or in bold-faced type. For example, if the softkey label array includes two row of icons with three icons per row (or four icons per row as shown in FIG. 1), the button array would include two rows of corresponding buttons with three buttons per row (or four buttons per row as shown in FIG. 1). If the user toggles the array of auxiliary softkey labels 240, 250 to bring up a new set of available softkey labels 240, 250, the corresponding auxiliary buttons 340, 350 may be illuminated based on whether a particular setting or feature has been designated, e.g., a "mute" function shown as an available auxiliary softkey label may result in the corresponding auxiliary softkey button being illuminated if the mute option is activated, and appear non-illuminated if the mute option is currently not selected by the user. Accordingly, the button array and softkey label arrays serve as intuitive, visual indicators of the current status of numerous functions/settings within a single view of a user interface.

Backup/Restore

Referring to FIGS. 4-7, the user interface, e.g., the display 200 and/or associated line, menu, softkey, contacts button, call log button, menu button, navigational and/or contact buttons may be used to implement various web-based communications between the IP phone 110 and the server 103. For example, the interface of the phone 110 may be utilized to achieve a backup and/or restore function of user settings and personal contacts entries made available via an HTTP server 103, including support of digest authentication. The registered telephone extension may be used as the user ID, and a manually-entered password may be associated with the extension and stored in reprogrammable non-volatile memory so that the data does not have to be entered unless the existing password is null or is rejected by the server. Since the HTTP server may contain settings files which indicate a variety of user settings and customized features, the backup and/or restore file formats will be implemented so that the file formats may be utilized across multiple platforms, e.g., across several different models of IP phones from a single manufacturer and/or across multiple IP phones from a plurality of third party manufacturers. For backup, In this way, it is possible to move call logs, local directory, speed dials, and button labels between stations when using PSA/IP login/logoff. The telephone uses an HTTP client to backup and restore user-specific data. Only one backup or restore attempt will be made per request. Retries are the responsibility of the initiating process. If the system value Backup/Restore Uniform Resource Identifier (BRURI) is null, or if it begins with any character sequence other than "http://", a failure indication will be returned to the initiating process in response to all backup and restore requests.

For backup, the initiating process supplies the backup file and the file name, and the file is sent to the server via an HTTP PUT message. A success or failure indication is returned to the initiating process based on whether or not the file is successfully transferred to the server. For restore, the initiating process must only supply the file name, and the file is requested from the server via an HTTP GET message. The file is returned to the initiating process if it is successfully obtained from the server, otherwise a failure indication will be returned.

For both backup and restore operations, the URI used in the HTTP message is constructed from the value of BRURI and from the file name, as follows. For example, if the value of BRURI ends with "/:ddd", where ddd is 1 to 5 ASCII numeric digits, the file name is inserted between the forward slash and the colon. If the value of BRURI ends with "/", the file name is appended. Otherwise, a forward slash will be appended to the value of BRURI and then the file name will be appended.

Various parameters may be set in a settings file, e.g., 96xxsettings.txt configuration file for the specified software release. For more information, see the Avaya one-X™ Deskphone Edition for 9600 Series IP Telephones Administrator Guide. The BRURI is the URI of the HTTP server used for backup and restore of user data. An exemplary subdirectory can be specified in the settings filed, e.g., A subdirectory can be specified, for example:
SET BRURI http://135.8.60.10/backup By putting the user backup/restore files in a subdirectory away from all other files (.bins, .txts, etc.), authentication may be turned on for that subdirectory, without turning it on for the root directory. HTTP authentication is used for backup and restore operations. The authentication credentials and the realm are stored in reprogrammable non-volatile memory that will not be overwritten if new telephone software is downloaded. The default value of the credentials and the realm will be null, which will be set at manufacture and at any other time that user-specific data is removed from the telephone. If an HTTP backup or restore operation requires authentication and the realm in the challenge matches the stored realm, the stored credentials is used to respond to the challenge without prompting the user. However, if the realms do not match, or if an authentication attempt using the stored credentials fails, the user will be prompted to input new values, with the following displayed on the prompt line of display 200, e.g., "Enter backup/restore credentials."

If an HTTP authentication for a backup or restore operation is successful and if the userid, password and/or realm used is different than those currently stored in the telephone, the new value(s) will replace the currently stored value(s).

For example, referring to FIG. 4, the IP phone 110 can support the HTTP client to back up and restore one or more of the user-specific data indicated therein. For example, the user-specific data may include one or more, or all of the following settings: call log settings, bridged call settings, accessory gain control settings, audio path settings, button click settings, error tone settings, ring tones, user interface settings, visual alert settings, call timer settings, and/or redial settings. For backup, the telephone creates a file with all the user-specific data if a backup file location is specified in system parameter BRURI. The file is sent to the server by an HTTP PUT message, with appropriate success or failure confirmation. For restore, the initiating process must supply only the backup file name. The file is requested from the server by an HTTP GET message. If successful, the file is returned to the initiating process, otherwise a failure message is returned. Backup and restore operations construct the URI used in the HTTP message from the value of the BRURI parameter and from the file name as follows:

HTTP authentication is supported for both backup and restore operations. The authentication credentials and realm are stored in re-programmable, non-volatile memory 203a, which is not overwritten when new telephone software is downloaded. Both the authentication credentials and realm have a default value of null, set at manufacture or at any other time user-specific data is removed from the telephone. The new value(s) may replace the currently stored values when HTTP authentication for backup or restore succeeds and if the userid, password or realm used differs from those currently stored in the telephone.

If HTTP authentication fails, the user is prompted to enter new credentials. Users can request a backup or restore using an options screen, that may be accessible by a predetermined combination of line buttons, accessible menus, and/or softkeys associated with display 200. the Advanced Options Backup/Restore screen, as detailed in the user guide for their specific telephone model.

Referring to FIGS. 4 and 5, when the system parameter BRURI is non-null, user changes are automatically backed up to a predetermined file extension, e.g., file ext_96xxdata.txt on the HTTP server to a user-specified directory. Backup formats are further defined as shown in FIG. 5, e.g., user-specific data, user-specific contacts, user-generated call appearance features, and/or user-generated button or softkey features.

During a restore process, when automatic or user-requested retrieval of backup data is initiated, system values and internal values are set to values contained in the backup file. This will typically occur only if an OPSTAT parameter setting allows the user to change those values. Therefore, any restrictions set using OPSTAT are recognized and honored. For example, the backup file value is not retrieved, and the current setting remains valid when a value in the backup file has changed and that value corresponds to an application that OPSTAT indicates should not be changed.

This prevents a user from bypassing the administration of OPSTAT and changing option settings in the backup file. If the Application Status Flag, APPSTAT, parameter is administered to suppress changes to one or more applications, the telephone backs up and restores data as usual, but ignores data for "suppressed" applications. This prevents a user from bypassing APPSTAT restrictions by editing the backup file, e.g., the administrator, might not want the user to have a level of functionality at every client device. For example, a hotel lobby telephone may be limited in the ability to customize the concierge's contact number. Further, for privacy reasons, that same telephone should not allow a Call Log display. The APPSTAT, to administer specific application functionality permission levels for one or more telephones.

During backup file restoration, user activity is typically prohibited until a Restore successful or Restore Failed message displays on the user interface 200. When a restore attempt fails, e.g., if a retrieved file has no valid data, or if a retrieved file cannot be successfully stored, a Retrieval Failed message is displayed on the phone 110 until the user takes another action. Exemplary situations when data retrieval may or may not be desirable include when a backup file is created rather than editing an existing one, during backup saves data values using the generic format name=value, e.g., for identifiers or parameters, when spaces preceding, within, or following a name are treated as part of the name. Blank lines can be ignored, and if an identifier is not recognized or is invalid, the entire line can be ignored. Likewise, if an identifier is valid but the data itself is invalid or incomplete, the line can be ignored. If an identifier is valid with valid and complete data, but the data is not applicable to the current state of the telephone, the data is retained for possible use later, and is considered data to be backed up at the appropriate time.

For example, if button labels for button module unit, e.g., AVAYA SBM24 are present, but no such module is attached to the telephone, the button labels are retained. If more than one line contains a value for an option, parameter, or Contacts entry, the last value read is retrieved, to allow new values to overwrite previous values as lines are read from the backup file. In all other cases, the line order in the backup file has no bearing on retrieval. However, the existence of invalid data does not constitute a failed retrieval. The success of the retrieval process requires the telephone to obtain the backup file and successfully restore valid data.

Figure 7:
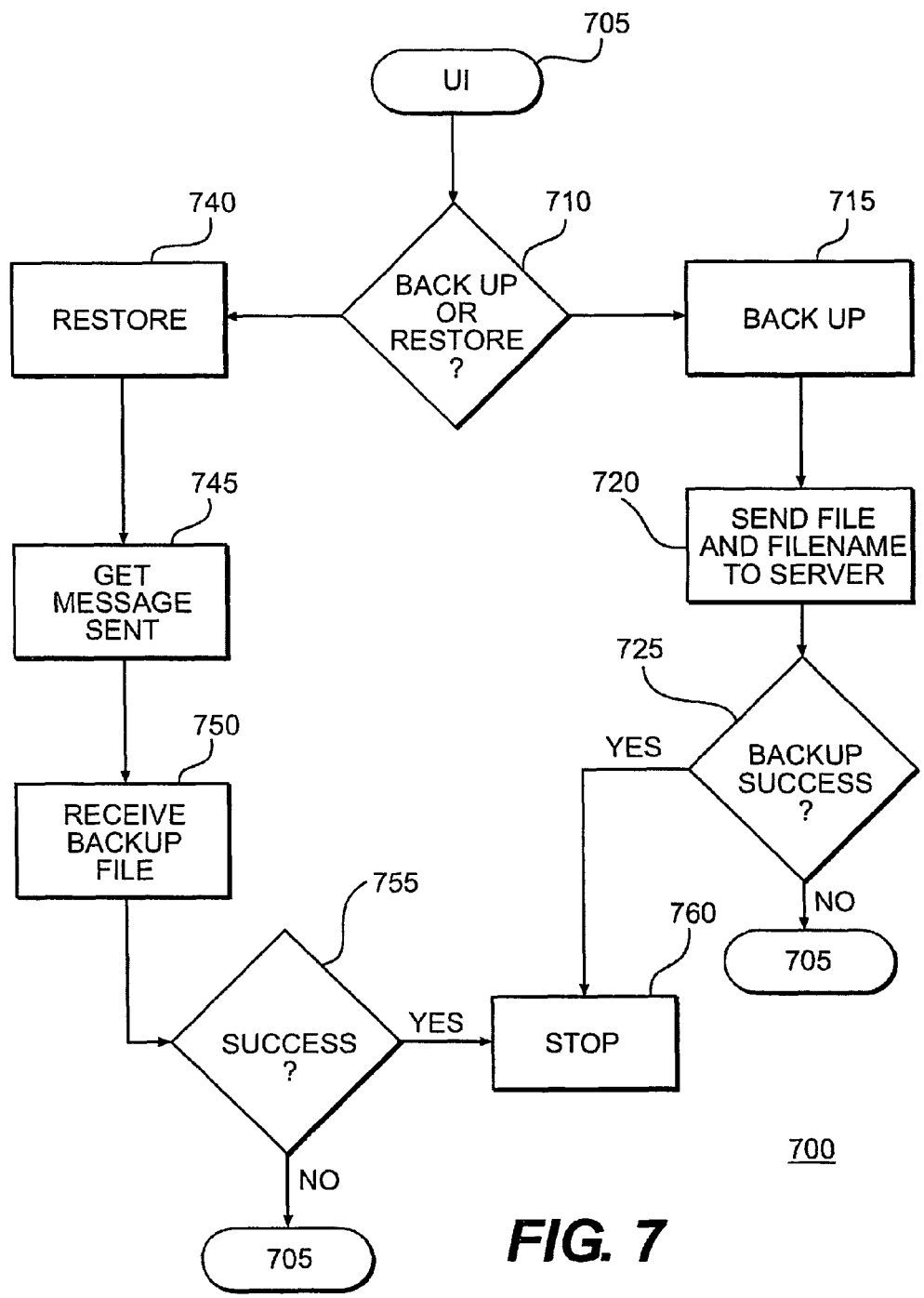
FIG. 7 is an exemplary process for backing up and/or restoring through an HTTP server.

Referring to FIGS. 6 and 7, the user interface 200a may be configured to execute exemplary logic for the restoration and/or backing up of user-specific settings, e.g., with the use of the BRURI of FIG. 6. In step 710, a user navigates through the user interface 200a to a backup or restore options menu 710. If a backup process is selected (715), a backup file and associated filename are sent to the HTTP server (720). If the backup file and associated filename are proper, the user interface will indicate that the backup operation was a success (725, 760). If not, the initiating process is repeated (705). If a restore operation is selected (740), an HTTP GET message is sent to retrieve the backup file (only the backup file) from the HTTP server 750. If the backup file is successfully retrieved, the user interface 200a will provide a positive or negative indication of success (755) and either conclude the process (760) and updating the client device settings in accordance with the backup file or return to the initiating process (705).

Alternatively, or in addition, an exemplary IP phone may also integrate one or more of the components shown in FIG. 3 such as through an integrated processing device or module, e.g., an analog telephony adapter (ATA) and/or combination of client software residing in memory. The ATA and/or client software may utilize audio codecs to handle data packet conversion, e.g., digital-to-analog conversion of incoming voice data. One or more VoIP protocols, such as, for example, H.323, may be used to define ways in which video, audio, and/or data is processed and/or transferred through the network using VoIP. The VoIP telephone 110 may also include a combination of hardware and software.

The display provides the user of the VoIP telephone the ability to view call information, power management information, to review and/or conduct messaging (such as text or email messaging), and/or may serve as a user interface, e.g., such as a graphical user interface and/or touchscreen. The input/output interface is shown as a monolithic device operably connected to a microphone and a speaker, e.g., such as in a VoIP handset (not shown). However, the input/output interface may include one or more individual and separate components, for example, such as an analog-to-digital converter for converting analog audio signals input through the microphone to digital data, and/or a digital-to-analog converter for converting digital data to analog audio signals which is output through the speaker, such as through a VoIP handset.

A VoIP phone may be used to make telephone calls over the internet through a standard network connection. Accordingly, the VoIP phone includes one or more Ethernet connections, e.g., such as RJ-45 Ethernet connectors. The Ethernet connections permit the phone to exchange data and/or receive power, such as PoE, through a single connection, e.g., a twisted pair, CAT5e Ethernet cabling, and a modular connection. Alternatively, or additionally, the VoIP phone may include an external power supply connection, for example, for connecting to an external wall outlet through an AC/DC or other wall adapter to provide an independent power supply for each networked client device.

In addition, the VoIP phone 400 may include a USB (or other accessory) port and USB interface for connecting a variety of peripheral devices, such as, for example, memory devices, cellular telephones, personal digital assistants (PDAs), and/or night lights. Although many peripheral devices connecting through the USB port may be provided with independent or integrated power supplies, some peripheral devices may draw power through the VoIP phone, such as for charging the internal power supply of a PDA connected through the USB port. Peripheral devices drawing power through the USB port may draw varying amounts of power, e.g., typically 2.5 W or less, through the VoIP phone and the power source being used by the VoIP phone, e.g., through an AC/DC wall adapter if connected through connection or through the Ethernet (PoE).

If the VoIP phone is being powered in a PoE mode, power supply issues may arise for the VoiP phone 400 and/or the network to which the VoIP phone is connected to and drawing power. For example, if a user plugs a peripheral device into the USB port, such as a PDA that recharges an internal battery while connected through the USB port, one or more power supply issues may arise if the VoIP phone is receiving PoE. If the VoIP phone 400 is only receiving enough power from the PoE source to power the VoIP phone, the addition of peripheral devices can overload and/or damage the power supply of the PoE, overheat the network connections or cables, and/or cause unexpected drops in the voltage level of the PoE that may lead to software errors and/or resetting of one or more other networked devices, including the VoIP phone. Alternatively, the user may require faster data transfer rates through the VoIP phone, which may necessitate operating off of an independent power supply, e.g., so that all of the twisted pairs of the Ethernet connection are being utilized for data transfer and not data and PoE.

Accordingly, the VoIP phone may include one or more power detectors, a power controller for executing software for detecting the power source and designating a power signature for the VoIP phone, and/or a PoE power signature switch enabling the user and/or software to manually adjust the power signature, e.g., PoE power classification 0, 1, 2, 3 and/or 4. However, it will be appreciated that the power controller and any other process controllers associated with various functions of the VoiP phone may be accomplished by a microprocessor which integrates the various controllers within a single monolithic device, such as processor. The VoIP phone may include one or more power detectors for sensing the presence of power through one of the power sources, e.g., whether the VoIP phone is receiving power through the AC/DC wall adapter connection or through PoE. The power detector may include a sensor or sensors for detecting the flow of current through each of the various power connections, e.g., a donut-shaped coil surrounding each conducting wire(s) or conducting pin passing through the coil.

If the VoIP phone is receiving power through an independent power supply, such as through an AC/DC adapter connected to the connection, the power controller may process software enabling the VoIP phone to also power peripheral devices through the USB port. Alternatively, or in addition, if the VoIP phone 400 is receiving power through PoE, the VoIP phone may prompt the user to disconnect the USB port 415, connect an independent power supply through connection, and/or to adjust the power signature of the VoIP phone manually, e.g., move switch positioned on the housing of the VoIP phone to a higher power classification supporting peripheral devices, e.g., from a PoE class 2 signature to a PoE class 3 signature. Alternatively, or in addition, the VoIP phone may automatically disable and/or adjust the power signature of the VoIP phone, e.g., through software residing within the phone and managed by the power controller.

In addition, or alternatively, the power detector may include a sensor or sensors determining if a peripheral device connected through the USB port is drawing power through the VoIP phone and USB interface. The power detector may include sensors for each power source and/or for each USB port provided on the VoIP phone. For example, if the VoIP phone is provided with an Ethernet port, an AC/DC adapter connection (or AC power connection with internal AC/DC transformer within the VoIP phone), and a pair of USB ports, the power detector 430 may include four independent sensors configured to detect current levels or power through the respective connections. Alternatively, the power detector 430 may include an integrated power detection module (as shown in FIG. 4) detecting current and/or power for each power source and device drawing power through the VoIP phone 400. Accordingly, one or more of the sensors may be configured to only detect current flow and/or actually measure current passing through the sensor, e.g., such as a donut-shaped coil surrounding the conducting wire and configured to detect and measure current passing through the conducting wire in a manner similar to a FLUKE™ clamp meter.

The power controller 435 determines the presence of current flowing within the powering wire of the USB port 415, e.g., to determine the active power source, and/or measures a total power or current draw for the VoIP phone 400 and any peripheral devices connected through the USB port 415, e.g., to determine the total power consumption for the VoIP phone 400. Alternatively, or in addition, the power controller 430 may determine the collective power draw of the VoIP phone 400, including any adapters, modules, and/or peripheral devices, each time the VoIP phone 400 is reset and/or each time an adapter, module, and/or peripheral device is connected or disconnected from the VoIP phone 400. The power controller 430 and/or processor 470 may monitor the USB port 415 and enable or disable the USB port 415 based upon actual real time power usage measurements at the USB port 415. Accordingly, the remainder of the network is protected from over current situations, such as when operating the VoIP phone 400 off of PoE.

While the foregoing implementations have been described in connection with a deskphone 110, any telephony device supporting circuit switching, packet switching, and/or other telephony networking may benefit from the implementations. Accordingly, the foregoing implementations are equally applicable to PDAs, VoIP phones, and/or mobile phones. An exemplary telephony device that may incorporate one or more of the foregoing implementations includes any of the Avaya ONE-X deskphones, such as the Avaya ONE-X 9600 and 9650 series.

The telephony device, e.g., deskphone 110 shown and described in connection with FIG. 3, may include a processor, a memory, the display 200, and an input/output interface. In addition, the phone, e.g., if used in a network, may include a network interface for sending and receiving data over a network connection, e.g., such as a standard RJ-45 Ethernet connection. The processor may include one or more processors for controlling, interpreting, and/or processing data exchanged between the telephony device and the network. The memory may be one or more memory devices or media capable of storing data or instructions. In addition, or alternatively, the telephony device may include an integrated processing device or module, e.g., an analog telephony adapter (ATA) and/or combination of client software residing in memory. The ATA and/or client software may utilize audio codecs to handle data packet conversion, e.g., digital-to-analog conversion of incoming voice data. One or more telecommunications protocols, such as, for example, H.323, may be used to define ways in which video, audio, and/or data is processed and/or transferred through the network which the telephony device is connected.

The preprogramming of the auxiliary softkey labels 240, 250 and/or softkey labels 230 into the telephony device can be achieved in several ways. For example, a system administrator, manufacturer, and/or user may update settings or functions, e.g., control which auxiliary softkey labels are displayed, through periodic updates, e.g., network patches sent to individual client devices to implement global and/or local updates to software resident in the memory of the telephony device. Alternatively, or additionally, the adjustment of softkey label settings may be implemented through a settings menu within the individual client device, e.g., through the menu option button 372. Exemplary methods of administering and/or programming an applicable telephony device are described in greater detail in Avaya one-X Deskphone Edition for 9600 Series IP Telephones Administrator Guide Release 1.2, Doc. No. 16-300698, e.g., available at http://support.avaya.com, the entire contents of which are hereby incorporated by reference.

Although some cell phones incorporate illuminated keys beneath a display, one implementation applied to mobile telephony devices, such as cell phones or PDAs, would include selectively illuminating only certain keys (or softkeys if provided) to correspond to display items on the display of the cellular telephone. Cellular telephones also have numerous functional controls, perhaps more than desktop telephones, such as "airport mode," "vibrate mode, "blue tooth," etc. The selective illumination of keys provides the user with the ability to quickly evaluate the settings of such functions. For example, if three icons or labels were on the display screen at one time, the user would instantly know if the airport mode was on or off, if the vibration setting for incoming calls was on or off, and/or if the blue tooth transceiver was on or off, simply by viewing the key board, e.g., the illuminated or non-illuminated keys.

Accordingly, the key board would act as an extended display, which would free up the relatively small display of a cellular telephone to show larger icons, etc. Accordingly, standalone softkeys in a button array, or existing keys, such as alphanumeric keys in a phone keypad may be used to provide selective illumination corresponding to an icon or label array which is displayed on a display screen of any telephony device. The alphanumeric keys may be included in an ISO (International Standards Organization), alphanumeric keypad for telephony devices, e.g., for cellular phones, for PDAs, and/or for deskphones. For example, the keypad may be a standard ISO, alphanumeric keypad for a deskphone shown in FIG. 1. The user interface may include separate softkeys, integrate the functionality of the softkeys into the alphanumeric keypad, or any combination thereof.

The coordinated display of softkey labels and the control of the associated functions and options may be implemented through hardware, firmware, a software module executed by a processor within the telephony device, or in a combination of the two. A software module may reside in RAM memory, flash memory, ROM memory, EPROM memory, EEPROM memory, registers, hard disk, a removable disk, a CD-ROM, or any other form of storage medium known in the art and capable of residing within the telephony device or associated network. An exemplary storage medium is coupled to the processor such that the processor can read information from, and write information to, the storage medium. In the alternative, the storage medium may be integral to the processor.

Accordingly, one implementation can include a computer readable media embodying a method for backing up and/or restoring client device settings, such as for the user interface, through HTTP. The computer readable media may be resident in the client device, on a network, or in any combination thereof. Accordingly, the invention is not limited to illustrated examples and any device for performing the functionality described herein are included in embodiments of the invention.

The phone 110 may include various other features. For example, the phone may be configured to accept power from either an IEEE 802.3af source (on the signal pairs or on both "spare" pairs) or from an aux source (on pins 7&8) of the Ethernet line interface, and the ability for software to determine whether power is being drawn from an 802.3af or from an aux source. A maximum power consumption may be permitted through a power management routine that meets the IEEE 802.3af class 2 limit when no modules, adapters, or USB devices are connected to the phone 110. The phone 110 may be configured to limit the amount of power that can be used by a module, adapter, or USB device to a maximum of ½ watt until software determines that the device can be supported. Accordingly, the phone 110 may include a user/craft-settable, software-readable switch on the back of the telephone to set the IEEE 802.3af power signature to class 2 or class 3, with a factory default setting of class 2;

The phone 110 may include a stand that supports the telephone in either a low (relatively horizontal) or high (relatively vertical) position on a flat, horizontal surface, and a physical design that supports the rigid attachment of a module in either the low or high position with that stand the ability to support adapters only with a different stand that only supports the telephone in a low (relatively horizontal) position on a flat, horizontal surface. Adapters may also be supported in the high (relatively vertical) position as well. The standard phone stand, e.g., in a lobby phone, must be easily removed and the new stand easily installed, without the need for special tools.

A removeable faceplate on the main phone body and the display housing facia, e.g., adhesive backed or screwed to the front, can be changed due to color, local language printing, or a higher quality finish. The faceplate will be changed during manufacture of the products, and/or in a post-manufacture staging area. The phone may also include circuit board and rubber keypad designs that include two additional button contacts, one to the left of the dial pad key 1, and 1 to the right of dial pad key 3, and 1 on each end of the applications cluster (to the left of Contacts and the right of Call Log) for use by a future telephone version, and a physical design that would allow these buttons to be added to a future telephone version without requiring a new sub-bezel molding tool. Alternatively, or in addition, the phone 110 may incorporate a 4-pin modular handset jack and audio circuitry capable of supporting handsets that transmit and receive 7 kHz audio. The handset that is capable of transmitting and receiving 7 kHz audio, that is hearing aid compatible, and that fits into a TDD acoustic coupler without an adapter, is lightweight, e.g., that weighs approximately 141 grams, and is distributed evenly (balanced).

Another embodiment provides a system and method of consolidating a display view on a telephone and a web browser that does not have fixed (permanently assigned) navigation buttons associated with its display. For example, one embodiment is directed to a system and method of consolidating a display view on a telephone for facilitating web browsing and navigating content with phone line buttons and phone keypad buttons.

Conventionally, wireless markup language (WML) browsers have been used to render wireless application protocol (WAP) pages. A number of different conventional WAP (WML) browsers are known for phones (e.g., mobile phones) as well as a number of software development kits (SDKs) for developing and hosting WAP applications. However, such conventional browsers can implement WML capabilities differently (i.e., by ignoring tags, ignoring attributes, and rendering differently) and some even use additional tag extensions. Since the conventional browsers differ so much it is difficult to provide any one WML page that displays well in all browsers.

A system and method for navigating web pages via an Internet Protocol (IP) telephone in general, and, more particularly, to a system and method for navigating web pages via an IP telephone that does not have permanently assigned navigation buttons associated with its display is contemplated. Exemplary embodiments of a browser for use in an identifiable class of internet protocol (IP) telephone stations that incorporate a web browser that does not have fixed (permanently assigned) navigation buttons associated with its display, may include one or more of the following features: Line Buttons, an OK selection button, softkeys, and left and right cursors can be used to navigate within and between web pages.

By way of an illustrative example, one station of the supported class of telephone terminals may have zero (0) Line Buttons to the side of the display, while another terminal may have three (3) Line Buttons to the side of the display, while yet another terminal may have six (6) Line Buttons to the side of the display. In accordance with one aspect, the browser can be operative such that either the fixed Line Buttons (if present) or the OK button can be used to select items on displayed web pages since there is no guarantee that there will be any fixed Line Buttons on the terminal.

According to another aspect, items in focus can be given the same highlighting treatment as other applications receive. The term "focus" generally refers to an adaptation of WML, which includes focusing on a particular line on the screen. Since the telephone terminal of the exemplary embodiment does not have a mouse to navigate around the screen, the Line Buttons that are located on the sides of the screen (if they exist) can be used to move the focus to the corresponding display line and to select a particular line on the display, or "to bring that line into focus". Alternatively, Up and Down Navigation buttons or controls can be used to select a particular line on the display, or "to bring that line into focus". Focusing on a line can be used to select a line for text entry or to select a line that contains a link to another URL (card). Additionally, new titles may (i.e., if they exist) be presented to the user on the WML Top Line as each line on the screen is individually brought "into focus" (e.g., selected by pressing the Line Buttons).

In one embodiment, the OK button may not control focus. Instead, the OK button can initiate the default action for the line that has the focus. The Line button may combine these two processes in a single step. For example, the single step of pressing a Line button can navigate to the corresponding line (and thereby gives it the focus) and launch the default action (if any).

Other embodiments of the web browser can be configured to support, for example, JPEG and WBMP images and Cascading Style Sheets Version 2 to render color backgrounds, text and images in the web rendering area as well as rendering images in the softkey area. Accordingly, an exemplary embodiment described above can provide a system and method of consolidating a display view on a telephone terminal and a web browser that does not have fixed (permanently assigned) navigation buttons associated with its display. Further, the exemplary embodiments can provide a system and method of consolidating a display view on a telephone terminal for facilitating web browsing and navigating content with phone line buttons and phone keypad buttons. The embodiments also can enable a telephone terminal to display any one WML page well, irrespective of the navigation buttons associated with the telephone terminal.

Although detailed embodiments and implementations have been described above, it should be apparent that various modifications are possible without departing from the spirit and scope of the present invention.

What is claimed is:

1. A method for backing up user-specific settings for an IP telecommunications terminal, the method comprising:
    initiating a backup process through a user interface of the IP telecommunications terminal, wherein a file name and a backup file are supplied from the telecommunication terminal;
    transferring the backup file to an HTTP server via an HTTP PUT message; and
    determining if the backup file has been successfully transferred to the HTTP server, wherein determining includes receiving an indication of a successful transfer or a failed file transfer.

2. The method according to claim 1, wherein the backup file comprises settings relating to at least one of the following parameters from the group consisting of call log settings, bridged call settings, accessory gain control settings, audio path settings, button click settings, error tone settings, ring tones, user interface settings, visual alert settings, call timer settings, and redial settings.

3. The method according to claim 2, wherein the backup file includes at least two of the parameters consisting of call log settings, bridged call settings, accessory gain control settings, audio path settings, button click settings, error tone settings, ring tones, user interface settings, visual alert settings, call timer settings, and redial settings.

4. The method according to claim 3, wherein the backup file includes call log settings, bridged call settings, accessory gain control settings, audio path settings, button click settings, error tone settings, ring tones, user interface settings, visual alert settings, call timer settings, and redial settings.

5. The method according to claim 4, wherein the backup file comprises user-specific data, user-specific contacts, user-generated call appearance features, and/or user-generated button or softkey features.

6. The method according to claim 1, wherein the backup file comprises user-specific data, user-specific contacts, user-generated call appearance features, and/or user-generated button or softkey features.

7. The method according to claim 1, providing a uniform resource identifier (URI) designated for backup and restoration of user data from the HTTP server.

8. The method according to claim 7, wherein the URI identifies the HTTP server and a directory path for the backup file.

9. The method according to claim 8, further comprising restoring user-specific settings to the IP telecommunication terminal, wherein the backup file is transferred from the HTTP server to the IP telecommunication terminal.

10. The method according to claim 8, further comprising restoring user-specific settings to a second IP telecommunication terminal, wherein the backup file is transferred from the HTTP server to the second IP telecommunication terminal in response.

11. The method according to claim 1, further comprising:
    transferring an HTTP GET message to the HTTP server; and
    transferring the backup file to the IP telecommunications terminal in response to the HTTP GET message.

12. A system for backing up and/or restoring user-specific settings for an IP telecommunications terminal, the system comprising:
    a plurality of IP telecommunications terminals, each IP telecommunications terminal including a user interface configured to initiate a backup process and a restore process; and
    at least one HTTP server configured to store a backup file for user-specific settings for each user among a plurality of users associated with the telecommunications terminals, wherein the IP telecommunications terminals are configured to transfer each backup file to the HTTP server via an HTTP PUT message and to receive each backup file in response to an HTTP GET message.

13. The system according to claim 12, wherein each IP telecommunication terminal is configured to receive an indication of a successful transfer or failed transfer of a respective backup file sent to the HTTP server.

14. The system according to claim 13, wherein each IP telecommunication terminal is configured to modify a backup file comprising user-specific settings relating to at least one of the following parameters from the group consisting of call log settings, bridged call settings, accessory gain control settings, audio path settings, button click settings, error tone settings, ring tones, user interface settings, visual alert settings, call timer settings, and redial settings.

15. The system according to claim 14, wherein the backup file includes at least two of the parameters consisting of call log settings, bridged call settings, accessory gain control settings, audio path settings, button click settings, error tone settings, ring tones, user interface settings, visual alert settings, call timer settings, and redial settings.

16. The system according to claim 15, wherein the backup file includes call log settings, bridged call settings, accessory gain control settings, audio path settings, button click settings, error tone settings, ring tones, user interface settings, visual alert settings, call timer settings, and redial settings.

17. The system according to claim 16, wherein the backup file comprises user-specific data, user-specific contacts, user-generated call appearance features, and/or user-generated button or softkey features.

18. The system according to claim 14, wherein the backup file comprises user-specific data, user-specific contacts, user-generated call appearance features, and/or user-generated button or softkey features.

19. The system according to claim 12, wherein each IP telecommunications terminal is configured to replace a current backup file with a backup file associated with another user logging into the IP telecommunications terminal through PSA/IP login/logoff.

20. A non-transitory computer-readable medium having computer-executable instructions contained therein for a method for backing up and restoring user-specific settings for an IP telecommunications terminal, the method comprising:
    initiating a backup process through a user interface of the IP telecommunications terminal, wherein a file name and a backup file are supplied from the telecommunication terminal;
    transferring the backup file to an HTTP server via an HTTP PUT message;
    determining if the backup file has been successfully transferred to the HTTP server, wherein determining includes receiving an indication of a successful transfer or a failed file transfer;
    transferring an HTTP GET message to the HTTP server; and transferring the backup file to the IP telecommunications terminal in response to the HTTP GET message.

* * * * *